Dec. 24, 1929.    R. BAUCH    1,740,447

ELECTRICAL DISTRIBUTION SYSTEM

Filed March 12, 1926

WITNESSES:
R. S. Williams
E. R. Evans

INVENTOR
Richard Bauch
BY
Wesley G. Carr
ATTORNEY

Patented Dec. 24, 1929

1,740,447

UNITED STATES PATENT OFFICE

RICHARD BAUCH, OF BERLIN-CHARLOTTENBURG, GERMANY, ASSIGNOR TO WESTINGHOUSE ELECTRIC & MANUFACTURING COMPANY, A CORPORATION OF PENNSYLVANIA

ELECTRICAL DISTRIBUTION SYSTEM

Application filed March 12, 1926, Serial No. 94,202, and in Germany March 17, 1925.

My invention relates to electrical protective systems and particularly to protective systems for large distribution systems having a plurality of sections.

The object of my invention is to provide a protective system for a distribution system having a plurality of sections which renders the sectionalizing means on a portion of the system inoperative when a fault occurs upon another portion of the system.

In distribution systems embodying a plurality of sections with time-element protective relays controlling the sectionalizing of the system upon the occurrence of a fault, it is impossible to exceed a certain number of sections without requiring an excessively long time-adjustment of certain of the relays because of the differences in time adjustment of the relays required to obtain selectivity. For example, in the case of a large customer connected to a sectionalized supply network whose load network consists of a plurality of sections, the addition of the time settings of the relays upon the customer's network to the time settings of the relays upon the main distribution network amounts to a time element of several seconds and endangers the protection provided in the case of a fault upon the main network.

In accordance with my invention, a device is provided at the junction point between the two portions of the network or between the main and auxiliary networks for superimposing a control potential upon the system which renders the sectionalizing means on the main or unaffected portion of the network inoperative in the case of a fault in the other portion. The maximum time-element of the relay system is substantially reduced because it is no longer necessary to add the time settings of the relays in the two networks to obtain selectivity.

For a better understanding of my invention, reference may be had to the accompanying drawing, in which Fig. 1 is a diagrammatic view of an electrical distribution system embodying my invention and comprising main and auxiliary ring circuits;

Figure 1:
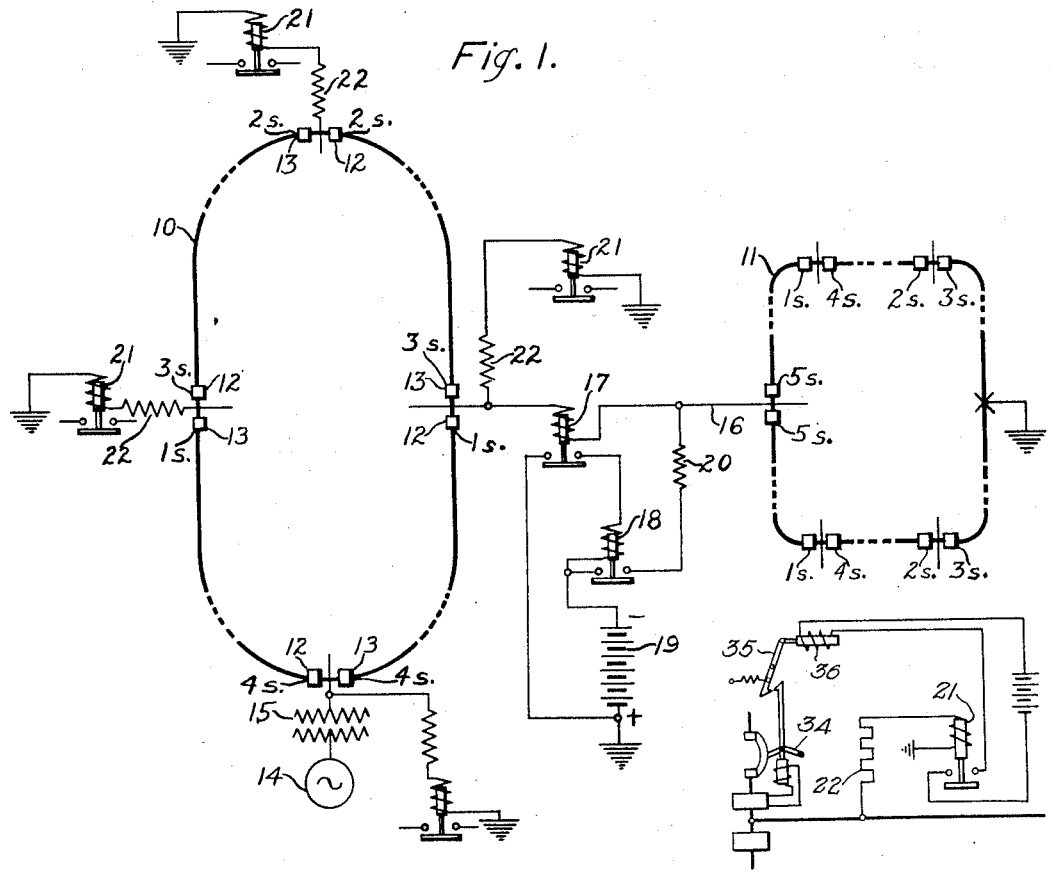

Referring to Fig. 1, an ungrounded electrical distribution system comprises main and auxiliary ring circuits 10 and 11, each comprising a number of sections and a pair of relays 12 and 13 at the terminus of each section for controlling sectionalizing means (not shown). Ring circuits of this character are commonly employed for primary distribution systems of high voltage which are subject to accidental grounds and short-circuits and which are, therefore, provided with relays, as indicated, for disconnecting a faulty section upon the occurrence of a fault.

The distribution system is connected to a generator 14 through a transformer 15 and the two ring circuits are connected by a feeder circuit 16.

In order to obtain selective operation of the sectionalizing means in each ring circuit, the relays are adjusted to operate at different rates and in accordance with the direction of the flow of the fault current. The relays nearest the source of supply are adjusted to operate with the longer time element.

For example, the relays 12 may be adjusted, as indicated, to operate in 1, 2, 3 and 4 seconds and the relays 13 which are operative upon the flow of energy in the opposite direction in the system, are adjusted to operate in 4, 3, 2 and 1 seconds, respectively. In the case of a fault, therefore, the faulty section, and only the faulty section, is disconnected at both ends by the relays 12 and 13 at the ends of the section.

In order to secure a similar selective disconnection of the faulty section in the auxiliary ring circuit 11, the relays in the auxiliary circuit must be similarly adjusted. It will be understood that, in order to obtain selective operation of the relays, an appreciable difference in time must be allowed between each relay. This difference in time, which may be as great as one second, is required because of the varying operation of the relays upon fault currents of different magnitudes and because of the time required for the sectionalizing means to operate. If the maximum time element of the auxiliary circuit relay system, however, is added to the time elements of the relays in the main network, the time adjustments of the main circuit relays are too long and defective protection would be provided for a fault on the main network.

In order to overcome this difficulty, a relay 17 is provided in the feeder 16 connecting the main and auxiliary networks which is responsive to the occurrence of a fault upon the auxiliary network 11. The contact members of the relay 17 control the circuit of a relay 18 which imposes a high potential from a source of current 19 upon the distribution system through the reactor 20. A relay 21 is provided at each sectionalizing point of the main network and connected to the system through reactors 22. In the case of a three-phase distribution circuit, the reactors 22 may be star-connected three-phase reactors providing an artificial neutral to which the relay 21 is connected.

Upon the operation of relay 18 a circuit is established for a current from the source 19, this circuit being as follows: from the positive terminal of the source of direct-current electromotive force 19 to and through the ground, to the coils of the relays 21, reactors 22, the circuit 10, a part of connecting line 16, reactor 20 and through the contact members of relay 18 to the negative terminal of source 19. The relays 21 become energized and control, in any desired manner, the sectionalizing means in such manner that the sectionalizing means will not operate upon the occurrence of a fault upon the auxiliary network. Consequently, the protective relays 12 and 13 of the main network may be adjusted, as indicated, to operate in time periods overlapping those of the relays in the auxiliary network.

Figures 2, 3:
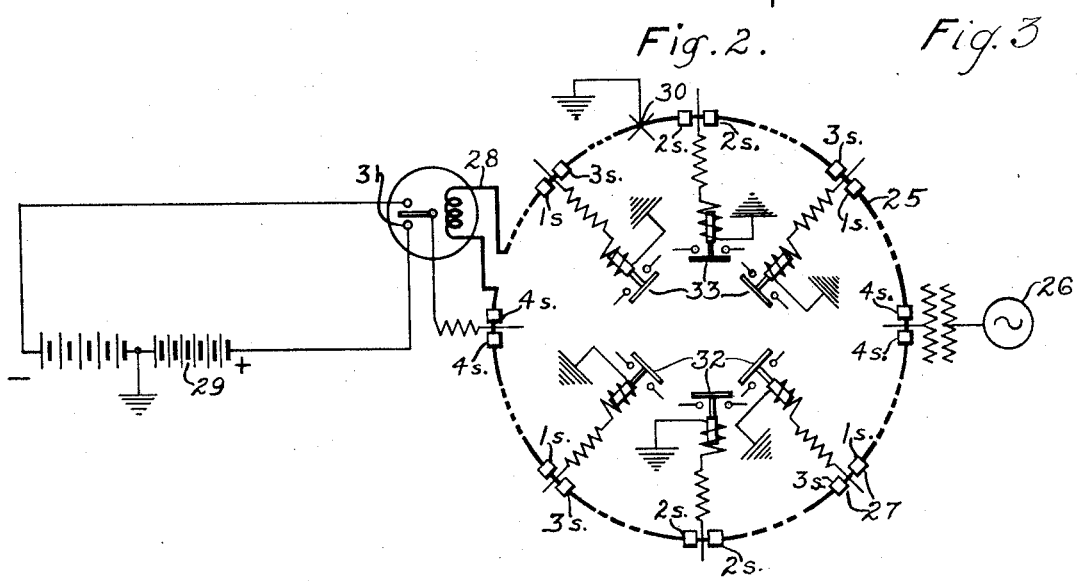
Fig. 2 is a similar view of a modification of my invention applied to a single ring distribution circuit.
Fig. 3 is a diagrammatic showing of a portion of the circuit shown in Fig. 1, illustrating a preferred means for preventing operation of certain of the circuit interrupters, in accordance with my invention.

Although the operation of the sectionalizing means may be controlled by various means, I prefer, in the present embodiment, to employ a scheme as illustrated in Fig. 3. The circuit interrupter 34 is controlled for movement to its circuit-opening position by a solenoid energized by the relay 13 in an obvious and well-known manner. Upon the operation of the relay 21, however, a circuit is completed through a winding 36 which effects the movement of the latch arm 35 into engagement with a notched extension on the toggle mechanism of the circuit interrupter. Therefore, even though the relay 13 is actuated, operation of the interrupter is prevented so long as the relay 21 is energized.

It is to be understood, of course, that a circuit as shown in Fig. 3 is associated with each of the relays 12, 13.

In Fig. 2 is shown a modification of my invention for decreasing the time adjustments of the relays in a large ring system having a relatively large number of sectionalizing points.

Referring to this figure, a ring circuit 25 is energized by a generator 26 and comprises a plurality of sections. A pair of sectionalizing relays 27 are provided at the ends of the respective sections in substantially the same manner as in the system shown in Fig. 1. At the middle of the ring circuit opposite the connection of the generator 26, a directional relay 28 is provided for applying a controlling potential to the circuit from a battery 29. If a fault occurs upon the upper half of the ring circuit, as indicated at the point 30, the directional relay 28 is so energized as to close the circuit between its upper contact member 31 and apply negative potential to the system. The relays 32 associated with the lower half of the ring are energized by this potential and render the associated sectionalizing means inoperative. Relays 33 associated with the upper half of the ring are responsive to the positive potential which is imposed upon the circuit by the relay 28 upon the occurrence of a fault in the lower half of the ring and render the associated sectionalizing means inoperative under these conditions.

By the provision of a relay 28 and the associated relays 32 and 33, the maximum time setting of the relays nearest the generator 26 is reduced to half of the required setting if these relays were omitted.

I do not consider that my invention is limited to the precise embodiments which I have shown and described and accordingly I do not wish it to be limited in scope except as indicated in the appended claims.

I claim as my invention:

1. An electrical protective system for a distribution system having main and auxiliary networks provided with sectionalizing means comprising means responsive to a fault upon one of the networks for rendering the sectionalizing means of the other network inoperative.

2. An electrical protective system for a distribution system having main and auxiliary networks provided with sectionalizing means comprising a relay connected to the system at the junction point of said networks, means whereby said relay operates upon the occurrence of a fault on said auxiliary network to apply a control potential to the system and means responsive to said control potential for rendering the sectionalizing means of the main network inoperative.

3. An electrical protective system for a distribution system provided with sectionalizing means comprising means responsive to a fault on a portion of the system for applying a control potential to the system and means responsive to said control potential for modifying the operation of the sectionalizing means of another portion of the system not directly involved in the fault.

4. An electrical protective system for a distribution system provided with sectionalizing means comprising means responsive to a fault on a portion of the system for applying a control potential to the system, and means responsive to said control potential for rendering the sectionalizing means of another portion of the system inoperative.

In testimony whereof, I have hereunto subscribed my name this 23d day of February, 1926.

RICHARD BAUCH.